Sept. 6, 1932.  L. SUVERKROP  1,875,829

SURVEYING INSTRUMENT

Filed Nov. 18, 1929  3 Sheets-Sheet 1

Lew Suverkrop
Inventor

Sept. 6, 1932.  L. SUVERKROP  1,875,829
SURVEYING INSTRUMENT
Filed Nov. 18, 1929   3 Sheets-Sheet 3

Leo Suverkrop
Inventor

Patented Sept. 6, 1932

1,875,829

UNITED STATES PATENT OFFICE

LEW SUVERKROP, OF BAKERSFIELD, CALIFORNIA

SURVEYING INSTRUMENT

Application filed November 18, 1929. Serial No. 407,999.

This invention relates to improvements in surveying instruments generally, and more particularly to those instruments of the character designed for the purpose of performing the functions of a surveyor's transit, especially the more portable form commonly designated as the hand transit type; and its functions are the reading of magnetic bearing or the reading of horizontal angles, and the determination of vertical angles.

With instruments of the type known as surveyor's transits, true horizontal and vertical angles can be obtained only when the "vertical axis" of the instrument is truly vertical. Otherwise the line of sight will not necessarily be in a vertical plane, with the result that sights taken which are not in the same horizontal plane as the instrument (as from a point in a valley to a point on a high mountain) will not necessarily result in true vertical and horizontal angles. With hand transits now in use it is quite difficult to obtain reliable results. The main reason for this is that such instruments generally do not provide means for readily observing, when taking a sight, both (1) when the compass or horizontal plate is level (i. e., when the axis is vertical), and (2) when the line of sight lies in a vertical plane. This has two unfortunate results: (1) it is difficult to get a compass reading within the range of accuracy which the magnetic compass would otherwise allow, and (2) bearings or horizontal angles, and vertical angles, are both likely to be inaccurate. Some compasses are provided with levels but none of these provides a means whereby an image of both compass and level are projected into or near the line of sight, or into the field of view, so that it may be easily and quickly observed that the axis is vertical and therefore that both horizontal and vertical angle readings will be accurate.

The main object of this invention is to provide a sighting device with a means for bringing into the field of view of the observer, for his quick and easy observation, an image of both (1) a compass reading, or other observation of horizontal angle, and (2) a level so that it may be readily observed when the axis of the instrument is vertical.

A further object of the invention is to enable the observer to similarly make rapid and accurate determination of vertical angle, by projecting into or near the line of sight an image of a level indicating when the axis of the instrument is vertical.

A further object of the invention is to provide a compact instrument with the functions described which may conveniently be attached to a pair of binoculars or other telescope to convert it into a convenient hand transit.

A further object of the invention is to provide a compact device to combine the functions of a telescope or other sighting device, a compass or other device for determining horizontal angles, and a clinometer, combining the advantages of all of such instruments and in addition possessing advantages of its own which are attributable to the joint arrangement of the three instruments in a unitary construction; especially in that it permits the taking of a sight on an object or a telescopic observation, and the reading of a horizontal angle and the determination of a vertical angle all in one operation, together with increased accuracy of the readings.

Other objects and advantages will be apparent from the following description when taken in connection with the accompanying drawings, in which.

Figure 1:
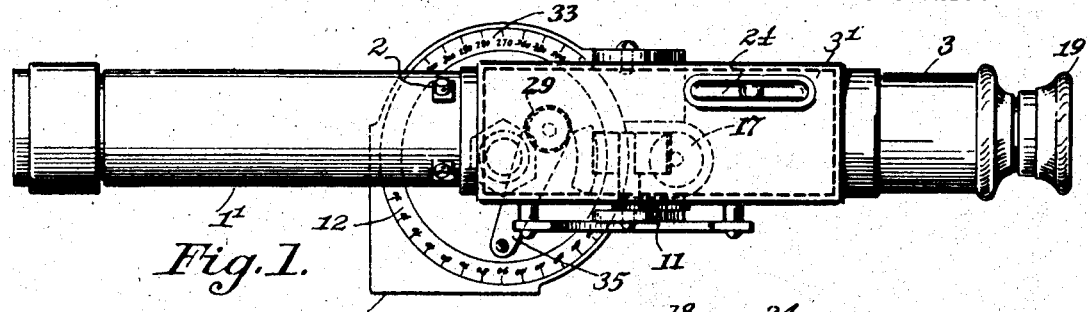
Figure 1 is a plan of one form of the improved instrument.
Figure 2:
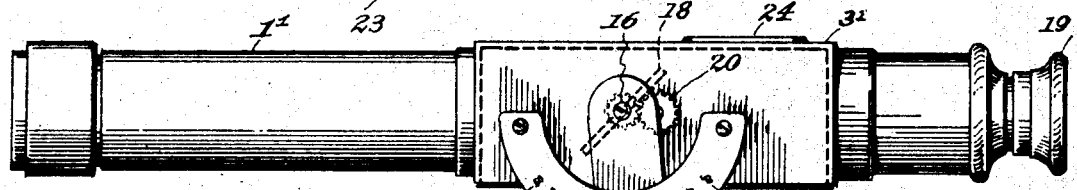
Figure 2 is a side elevational view thereof, parts being shown in section.

Referring to the drawings in more detail, and especially to Figures 1 and 2, the numeral 3 indicates a tube fitted into an auxiliary section 3'. A sighting tube 1' may be fitted into the auxiliary section 3' and may contain telescopic lenses, not shown, and a reticule fitted by means of the ordinary screws 2. Mounted on the tube 3' as by means of pivoted arms 11 is a combination of compass 12 and level 17. The compass 12 itself may be of any suitable construction, although here shown of the floating dial type provided with a support spindle 13, needle 14, and card or disc 15, and any conventional means for damping the needle and for supporting it from the spindle 13 while the instrument is being carried. As shown, the compass 12 is attached to the ends of the arms 11 through the horizontal plate 32 by means of a threaded boss 25 and nut 26 which permit the compass case to turn on the horizontal plate 32. The compass case is graduated as at 33 and an indicator or vernier 34 is provided on the horizontal plate, so that the compass case provides a graduated plate with which horizontal angles may be turned off by partly affixing the instrument to the ground, as by a Jacob's staff, using the female thread in the boss 25 for the connection. The construction as shown provides both functions of magnetic compass and graduated horizontal plates; but for the sake of simplicity in construction either alone may be employed.

Figure 3:
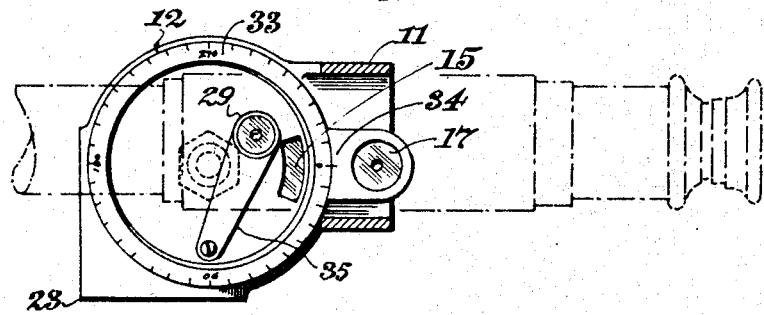
Figure 3 is a plan showing in detail one form of horizontal plate for the instrument, combining the horizontal angle determining part and the plate level.
Figure 8:
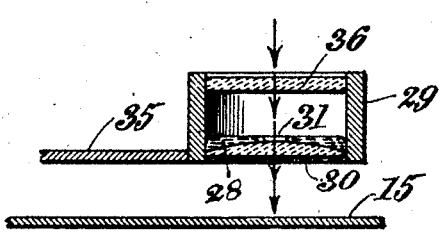
Figure 8 is an enlarged sectional view of one form of level and compass card.

If desired, either as an addition to the level 17 or to replace it, a novel level 29 might be employed. This may be either permanently attached in position over the compass card graduations or over the vernier 34 for the horizontal plate or it might be placed on a swinging arm 35 so that it might be brought over either the compass card graduations or the vernier 34 or swung back out of the way as shown in Figure 3, in which case the level 17 may be used and the compass card 15 or the vernier 34 viewed direct. The level 29 (Figure 8) has a transparent top 36 and a transparent bottom 30. The bottom 30 is convex as shown and on this mercury 28 rests, in sufficient quantity to form a hole 31 at the center, the hole 31 being of desired size for the purposes of observation when the plate is horizontal. The mercury is contained within the walls of the level 29. With a level of this form it will be immediately apparent to the observer through the instrument when the instrument is not in level, and observations of angle can readily be made when the instrument is level, through the hole 31. The type of level, 29, has an advantage in that it may be brought easily into the direct line of sight over the compass card; but it is to be understood, however, that either levels 17 or 29 will permit the instrument to perform as intended.

Figure 7:
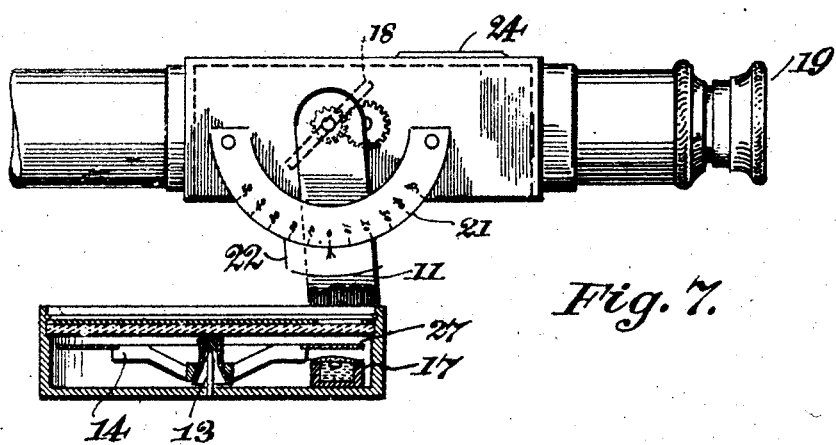
Figure 7 is a side elevational view partly in section of another form of compass and level arranged to bring observations of the two into a single line of sight.

Another form of compass is shown at Figure 7, in which the compass card 27 is of transparent material and the circular level 17 is placed so as to be viewed through the transparent card 27, in which case the markings on the card 27 would be opaque or translucent.

Any one of the suggested combinations of compass or device for reading horizontal angles, and level, would come within the scope of the invention. Moreover, while the drawings show circular levels it is to be understood that any level which will indicate when such an instrument is in level, such as the so-called T-level, might be used within the meaning of this specification of a combination level and angle turning device.

The image of the compass card 15 or angle turning device 33 and the level is reflected to the eye of the observer by means of a mirror 18. As shown, the mirror is fixed to a shaft 16. The arms 11 are free to oscillate about the same axis as that of the shaft 16 but are not connected to the shaft 16 except through the train of gears 20 in order that this mirror will always be in proper position for reflecting the image of compass and level to the eye of the observer at the eye-piece 19 of the tube 3. It will be understood, however, that other means may be employed for obtaining the necessary adjustment of the single mirror 18, if desired; and that two mirrors may be employed, one fixed to the tube 3 and the other to the moving element comprising the compass and level, for the purpose of transferring the image of the compass and level as reflected from the first mirror, the two mirrors being employed to avoid the mechanism here represented by the train of gears 20; but I prefer the single mirror shown in the drawings.

When it is desired to use the instrument as a clinometer, it is constructed with a graduated arc 21 attached to the auxiliary tube 3 and cooperating with a vernier 22 carried by the adjacent arm 11 to which the compass and level are attached. It will be apparent therefore, that vertical angles may readily be determined by bringing the cross hairs of the telescope into alignment with the object and adjusting the level to horizontal position as observed through the eye-piece 19 on the tube 3.

Figure 4:
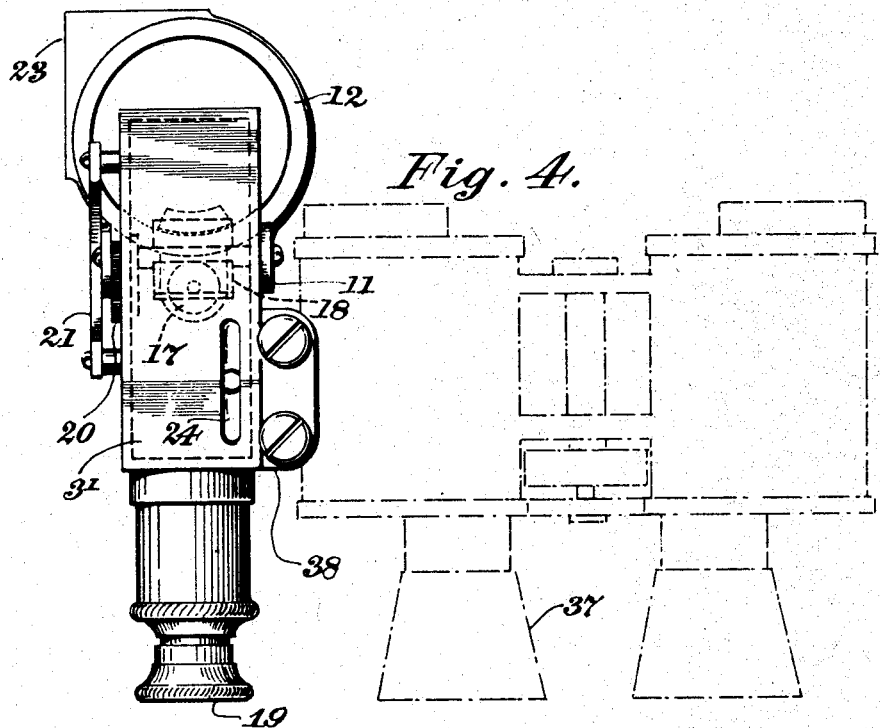
Figure 4 is a plan showing one form of the improved instrument as an attachment to a common form of telescopic instrument for use with two eyes.
Figure 4A:
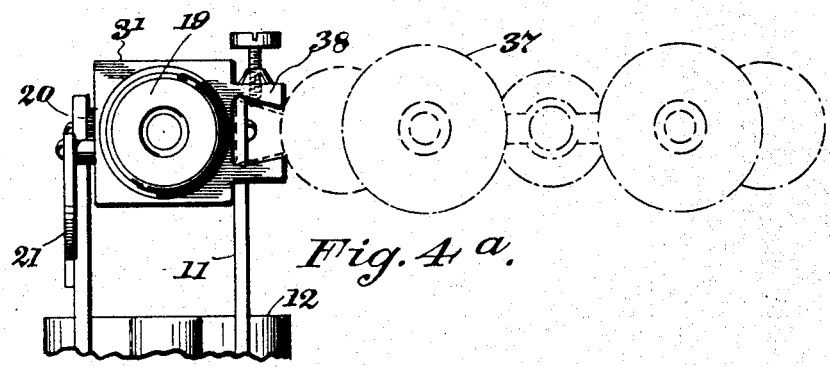
Figure 4a is an end elevational view of the disclosure of Figure 4.
Figure 5:
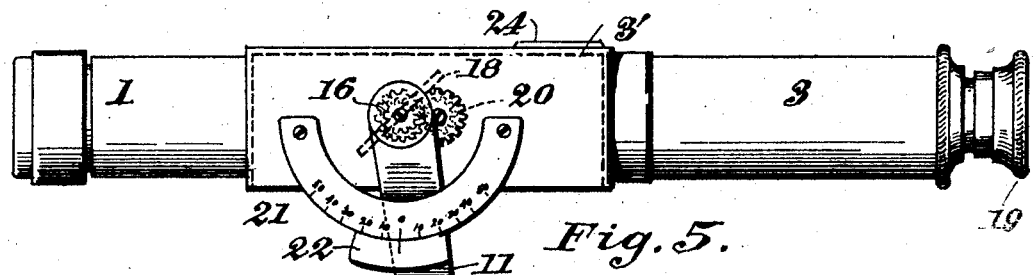
Figure 5 is a plan showing another form of the instrument as a more permanent attachment to a telescope.
Figure 6:
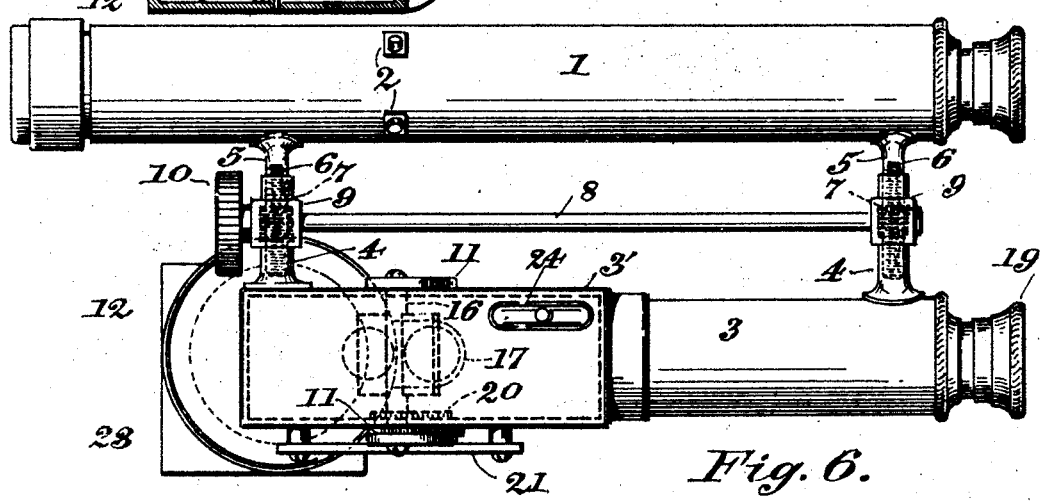
Figure 6 is a side elevational view thereof, parts being shown in section.

If desired, brackets or other ordinary means may be provided for the attachment of the tube 3—3' to a pair of binoculars 37, such as by the bracket 38 in Figures 4 and 4a, by which means an ordinary pair of binoculars or other form of telescope or sighting device may be converted into a surveying instrument of the class described. In this case the telescope or sighting tube 1' may be omitted from the tube 3' and the mirror 18 may extend across the field of view which will make it possible more easily to construct the instrument to obtain a clear view of the compass and level. If desired, the attachment of the tube 3 to a telescope or other form of sighting device may be made more permanent as shown in Figures 5 and 6, in which case suitable means may be provided for easy adjustment of the sighting tube 1 and the tube 3 to the proper interpupillary distance of the particular observer. As shown, the connection between these two elements, namely, the telescope 1 and tube 3—3' comprises sleeves 4, 4, secured to the tube 3—3' and in which are slidably mounted the rods 5, 5, secured to the telescope 1. The rods 5, 5, are preferably provided with rack teeth 6 adapted to cooperate with pinions 7 carried on a shaft 8; the latter being mounted in bearing 9 and rotated by means of a knurled head 10. By such means it will be apparent that the telescope 1 and tube 3—3' may be relatively adjusted so as to provide the proper interpupillary distance for the particular observer.

For the purpose of making dip and strike or other similar observations I preferably provide straight edges 23 on the compass case, as indicated in Figure 2. When so used, a spirit level 24 (Fig. 3) should also be employed.

In the operation of the device as a monocular instrument the observer places his eye at the eye-piece 19 of the tube 3, when he directs the tube 3 toward the object to be sighted. The object sighted is brought into the field of view and centered in the sighting tube 1'. The instrument is oscillated about its longitudinal axis and the horizontal plate is oscillated about its axis 16 until the level indicates that the plate is horizontal. It is preferable that the mass suspended from the arms 11 be counterpoised or balanced so as to hang normally from its pivots on 3' with the plate 32 level (i. e., the axis vertical) to facilitate in making the adjustment described. When the level indicates horizontal the compass is read while the object is kept centered. The instrument may then be removed from the eye and the vertical angle read on the arc 21. It will be clear that the device as described will bring into the field of view of the observer a view of the object, the compass, and the level. Horizontal angles may similarly be turned off and read, at the same time obtaining a determination of the vertical angle; but in this case the graduated plate 33 is employed which is secured or partly secured to the ground by means of a Jacob's staff or other support screwed into the boss 25.

In the operation of the device as a binocular instrument the device similarly brings into the field of view of the observer a view of the object, the compass or horizontal plate, and the level; but in this case the angle of view of the object may be greater because the view of the compass and level may overlay the view of the object.

From the foregoing description taken in connection with the accompany drawings it will be apparent to those skilled in the art that I have devised a novel attachment for facilitating the combined reading of a compass or other azimuth determining device and a level; that the attachment may be readily applied to various types of sighting devices; that when the attachment is so applied to a sighting device the combination provides a unitary construction adapted to function as a clinometer, a compass and a telescope; that this combination facilitates the making of rapid surveys in that sufficient accuracy is obtained without the need of a firm support such as a tripod or the like; and that it is so designed as to obviate the necessity of considerable experience for its successful operation.

In accordance with the patent statutes I have described what I now believe to be the preferred embodiments of the invention, but inasmuch as various minor changes may be made in the details of construction without departing from the spirit of the invention, it is intended that all such changes be included within the scope of the appended claims.

Having fully described my invention, what I claim as new and desire to secure by Letters Patent is:

1. In an instrument of the class described, a sighting tube, a compass and a level associated therewith, and means within the tube for producing and transmitting images of the compass and level to the field of view of the observer while viewing an object through said sighting device, and a casing surrounding the compass and level and supporting them directly from the sighting tube.

2. In an instrument of the class described, a sighting device, a compass, a level, means mounted on said device for pivotally suspending said compass and level below the sighting device, said means being balanced so as to hang normally from its pivots with the level and compass horizontal, and means for transmitting images of the compass and level to the field of view of the observer while viewing an object thru said sighting device.

3. In an instrument of the class described, a sighting device, an arm pivotally connected to said sighting device at one end and extending downward therefrom, a level connected to the other end of said arm, means for producing and transmitting an image of the level to the field of view of the observer, and means for measuring the movement of said arm about its pivot.

4. In an instrument of the class described, a telescope tube, a tube including an eye piece connected in parallel relation to said telescope tube, a compass and level connected to said second tube, and means for producing and transmitting images of the compass and level to the eye piece of said second tube, said second tube being closed at its end opposite to the eye piece and said compass and level being connected to said second tube so as to be below said second tube.

5. An instrument according to claim 4, in which there is means for varying the distance between the telescope and the tube.

6. An instrument according to claim 4 in which the telescope consists of a pair of binoculars.

7. In an instrument of the class described the combination with means for viewing a distant object on a limited field, of a compass and level connected to said means and means for optically projecting within the same field images of the compass and level, said compass and level being mounted within a single casing and said casing being pivotally suspended from said first means so as to hang normally from its pivots with the casing horizontal.

8. The combination with a sighting tube including an eye piece for viewing a distant object on a limited field, of a support carrying a compass and level below said tube, means mounted on said tube for pivotally suspending said support, said means and support being balanced so as to hang normally from the pivots with the compass and level horizontal, and means comprising a mirror mounted within said tube for reflecting the image of the compass and level to the eye of the observer at the eye piece.

9. An instrument according to claim 8 in which the mirror is mounted on a shaft and means are provided between the mirror and said support for adjusting the position of said mirror to correspond to varying positions of said support with respect to said tube.

10. An instrument according to claim 8 in which said support and said mirror are mounted on the same shaft and means are provided for automatically adjusting the position of said mirror to correspond to varying positions of said support with respect to said tube.

11. An instrument according to claim 8 in which said compass is carried by a cylindrical casing which is mounted to turn in a horizontal plane on said support, and means for measuring the movement of said compass with respect to said support.

12. An instrument according to claim 8 in which said level is mounted on a swinging arm.

13. An instrument according to claim 8 in which said level comprises a casing having a transparent top and bottom, the bottom being convex and a quantity of mercury in said casing such that when the level is horizontal the mercury will not cover said convex bottom.

14. An instrument according to claim 8 in which said compass comprises a transparent card having graduations and said level is located directly below said graduations, at the point where readings are to be taken.

15. An attachment for a pair of binoculars comprising a sighting tube including an eye piece, a support carrying a compass and level below said tube, means comprising a mirror, mounted within said tube for reflecting the image of the compass and level to the eye of the observer at the eye piece and means mounted on said tube for detachably connecting said attachment to one of the sighting tubes of a pair of binoculars.

LEW SUVERKROP.